(12) United States Patent
Egley et al.

(10) Patent No.: US 9,279,731 B2
(45) Date of Patent: Mar. 8, 2016

(54) MULTICHANNEL THERMOCOUPLE COMPENSATION FOR THREE DIMENSIONAL TEMPERATURE GRADIENT

(71) Applicant: Lam Research Corporation, Fremont, CA (US)

(72) Inventors: Fred Dennis Egley, Sunnyvale, CA (US); John Distinti, San Jose, CA (US); Peter Norton, Berkeley, CA (US); Andrea Wang, Danville, CA (US)

(73) Assignee: Lam Research Corporation, Fremont, CA (US)

( * ) Notice: Subject to any disclaimer, the term of this patent is extended or adjusted under 35 U.S.C. 154(b) by 381 days.

(21) Appl. No.: 13/797,091

(22) Filed: Mar. 12, 2013

(65) Prior Publication Data

US 2014/0269821 A1 Sep. 18, 2014

(51) Int. Cl.
*G01K 7/13* (2006.01)
*G01K 1/02* (2006.01)
*G01K 7/02* (2006.01)

(52) U.S. Cl.
CPC *G01K 7/13* (2013.01); *G01K 1/026* (2013.01); *G01K 7/023* (2013.01)

(58) Field of Classification Search
CPC ........... G01K 1/026; G01K 7/13; G01K 7/12; G01K 7/023; G01K 7/02

USPC .............. 374/54, 179, 45, E19.001, E15.001, 374/E15.002
See application file for complete search history.

(56) References Cited

U.S. PATENT DOCUMENTS

| | | | |
|---|---|---|---|
| 4,147,061 A * | 4/1979 | Wester et al. | 374/E15.001 |
| 4,718,777 A * | 1/1988 | Mydynski et al. | 374/E7.013 |
| 6,425,687 B1 * | 7/2002 | Kulczyk | 374/E3.005 |
| 7,234,864 B2 | 6/2007 | Streicher | |
| 2006/0067377 A1 * | 3/2006 | Streicher | 374/179 |
| 2010/0246630 A1 * | 9/2010 | Kaszynski et al. | 374/179 |
| 2012/0065923 A1 * | 3/2012 | Whiteley | 374/179 |
| 2012/0179407 A1 * | 7/2012 | Ge et al. | 702/99 |
| 2012/0197586 A1 * | 8/2012 | Zhang et al. | 374/E07.035 |

* cited by examiner

*Primary Examiner* — Lisa Caputo
*Assistant Examiner* — Philip Cotey
(74) *Attorney, Agent, or Firm* — Beyer Law Group LLP (57) ABSTRACT

A method of using a thermocouple is provided. The method includes, but is not limited to, disposing at least one temperature sensor at each of two or more respective portions of an electrical connector adapted to receive thermocouple signals, measuring temperatures at the two or more portions, and calculating the temperatures at each terminal of the electrical connector based on measured temperature values of the two or more respective portions having the disposed temperature sensors. The method also includes, but is not limited to, calculating a cold junction temperature of a terminal for at least one thermocouple channel carrying the thermocouple signals based on measured or calculated temperature values of the terminals, or a combination thereof.

13 Claims, 6 Drawing Sheets

MULTICHANNEL THERMOCOUPLE COMPENSATION FOR THREE DIMENSIONAL TEMPERATURE GRADIENT

BACKGROUND

The present invention relates generally to the field of temperature measurement and thermocouple devices. More particularly, the invention relates to a novel technique for effectively determining thermocouple cold junction temperature in a multi-channel terminal configuration.

Thermocouples are devices used to measure temperature and are one of the more versatile temperature sensors available. These temperature sensors or transducers are generally rugged and relatively inexpensive, and may be constructed of various metals. Thermocouples may be used to measure a relatively wide range of temperatures (e.g., −200° C. to 2600° C.) in a variety of applications and environments. In general, thermocouples rely on the principle that a voltage potential occurs when there is a temperature gradient along the length of a conductor.

A thermocouple device is formed by joining two conductors or wires of dissimilar metals to form a junction of the two wires called a measuring junction (or sensing junction, and so on). Although almost any two types of metal can be used to make the thermocouple wires, a number of standard types are used because they possess predictable output voltages and can handle large temperature gradients. The several types of thermocouples available may be designated by capital letters that indicate their composition according to American National Standards Institute (ANSI) conventions. For example, a J-type thermocouple has one iron conductor and one constantan (copper-nickel alloy) conductor.

The thermocouple measuring junction may be encased in a sensor probe, for example, with the probe positioned at the point of temperature measurement (i.e., at the temperature source). In principle, as the temperature of the measuring junction changes with the temperature source, a temperature gradient is formed (along the wires) between the measuring junction and the opposite free ends of the two wires. Advantageously, a predictable thermoelectric voltage is generated as a function of this temperature gradient. By taking into account the composition of the two dissimilar metal wires, this generated thermoelectric voltage (sometimes called the "Seebeck" voltage) can be related to the temperature gradient along the wires. This temperature gradient is summed with a reference or "cold" junction temperature to give the temperature of the source being measured. Thermocouple measurements typically require sensing or determining the reference temperature (the cold junction temperature) where the thermocouple wires connect to the voltage measurement system.

In construction, the two free ends of the thermocouple wires may be connected at a voltage measuring instrument (e.g., an analog to digital instrument, voltmeter, control instrument, temperature control module etc.) to measure the thermoelectric voltage. The connection of these two wires to the voltage measuring instrument is accomplished by using an electrical connector. An electrical connector is an electromechanical device for joining electrical circuits as an interface using a mechanical assembly. The connection formed using the electrical connector may be temporary, as for portable equipment, require a tool for assembly and removal, or serve as a permanent electrical joint between two wires or devices. There are hundreds of types of electrical connectors, including such devices as terminal blocks, posts, crimp-on connectors, insulation displacement connectors, plug and socket connectors, blade connectors, and ring and spade terminals. Sometimes, the electrical connectors are divided into two portions, with each portion connected with one of the two wires or devices to be connected to each other. Sometimes, the two portions of the electrical connector form a male/female arrangement.

When the two free ends of the thermocouple wires are connected at a voltage measuring instrument (e.g., an analog to digital instrument, voltmeter, control instrument, temperature control module etc.) to measure the thermoelectric voltage, the two free ends of the thermocouple wires are connected to the voltage measuring instrument using a connector, such as a terminal block, and forms a second junction of the thermocouple wires called a reference junction (or cold junction). The connection of these two wires at the connector forms the second junction of the wires called the reference junction (or cold junction). The term "cold junction" comes from the traditional practice of holding this reference junction at zero degrees Celsius in an ice bath. However, maintaining an ice bath is not practical for most measurement applications. Thus, the actual temperature of the point of connection of the thermocouple wires to the measuring instrument is measured and recorded. As discussed above, the cold junction may be formed at the electrical connector which connects the two free ends of the thermocouple wires to the voltage measuring instrument. Sometimes, the electrical connector, and therefore the cold junction, is a single piece, such as with a terminal block, and other times, the electric connector and the cold junction may be divided into two or more pieces or portions, with each portion connected with one of the two wires or devices to be connected to each other.

Typically cold junction temperature may be sensed by a thermistor or other temperature sensor or device such as a semiconductor temperature sensor, which is in relatively good thermal contact with the input connectors of the measuring instrument. Again, this second temperature reading, the cold junction temperature, is used by the measuring instrument to calculate the true temperature at the thermocouple tip, the measuring junction.

In sum, to determine the measured temperature of the source (i.e., the component, process, system, equipment, etc.) at the measuring junction of the two wires, the calculated temperature gradient based on the measured voltage is summed with the cold junction temperature (e.g., measured with a thermistor) at the voltage measuring instrument or terminal block. Thus, in operation, a thermocouple measures temperature by generating a voltage (e.g., millivolt) proportional to the temperature difference between the measuring and cold junctions of two dissimilar metals. For smaller changes in temperature, the voltage is substantially linearly proportional to temperature difference. For relatively larger changes in temperature, the relationship may become nonlinear.

In ever-increasing demanding applications in precision temperature measurement, and with equally-demanding desires to reduce costs, the cold junction temperature measurement can be problematic. In a variety of configurations, errors in the measurement of the cold junction temperature give errors in the measurement of the source temperature. A typically accurate but expensive technique is to use a high-accuracy thermistor affixed to each terminal or to the channel that contains the two terminals. A less expensive but also less accurate solution is a single integrated circuit sensor. A particular problem is with electrical connectors which have multiple portions. For example, an electrical connector may have a first portion connected to a circuit board encased within a housing, and a part of that first portion may even be extending from the circuit board and out of the housing, and a second portion which is separate from the first portion and which may connect to the first portion outside of the housing and away from the circuit board.

Relatively significant temperature gradients may exist across both portions of the electrical connector, including the first portion which is connected with the circuit board within the housing and between the components within the housing and the second portion which resides in the atmosphere outside the housing. There is a need, therefore, for cost-effective and accurate measurement of cold junction temperature in an electrical connector having multiple portions.

SUMMARY

The present invention is defined by the following claims, and nothing in this section should be taken as a limitation on those claims.

In one aspect, a method of using a thermocouple is provided. The method includes, but is not limited to, disposing at least one temperature sensor at each of two or more respective portions of an electrical connector adapted to receive thermocouple signals, measuring temperatures at the two or more portions, and calculating the temperatures at each terminal of the electrical connector based on measured temperature values of the two or more respective portions having the disposed temperature sensors. The method also includes, but is not limited to, calculating a cold junction temperature of a terminal for at least one thermocouple channel carrying the thermocouple signals based on measured or calculated temperature values of the terminals, or a combination thereof.

In one aspect, a method of measuring a reference property at a source is provided. The method includes, but is not limited to, disposing at least one measuring device at each of two or more respective portions of an electrical connector adapted to receive measurement signals from the source, measuring a reference property at the two or more portions, and calculating the reference properties at each terminal of the electrical connector based on measured reference property values of the two or more respective portions having the disposed measuring devices. The method also includes, but is not limited to, calculating an overall reference property of a terminal for at least one channel carrying the measurement signals based on measured or calculated reference property values of the terminals, or a combination thereof.

In one aspect, an apparatus for measuring a temperature at a source is provided. The apparatus includes, but is not limited to, a thermocouple measuring junction to be positioned at the source and connected with at a reference junction via first and second wires and an electrical connector at the reference junction. The electrical connector includes a first and second portion. The first portion is connected with the reference junction and the second portion is removably connected with the first portion. The apparatus also includes, but is not limited to, at least one temperature sensor disposed at each of the two portions of the electrical connector adapted to receive thermocouple signals. The temperatures at the two or more portions may be measured using the temperature sensors. The temperatures at each terminal of the electrical connector may be calculated based on measured temperature values of the two temperature sensors. A cold junction temperature of a terminal for at least one thermocouple channel carrying the thermocouple signals may be calculated based on measured or calculated temperature values of the terminals, or a combination thereof.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

The present invention makes use of the discovery that by disposing at least one temperature sensor at each of two or more respective portions of an electrical connector adapted to receive thermocouple signals, and then by measuring the temperatures at each portions using the temperature sensors, a cold junction temperature of an electrical connector may be calculated for at least one thermocouple channel carrying the thermocouple signals, in a reliable and cost effective manner.

Referring to FIGS. 1A-1E, and 2, there is shown an exemplary multi-channel or multi-tier electrical connector 10. The electrical connector 10 is an electro-mechanical device for joining electrical circuits as an interface using a mechanical assembly. The connection formed using the electrical connector 10 may be temporary, as for portable equipment, require a tool for assembly and removal, or serve as a permanent electrical joint between two wires or devices. There are hundreds of types of electrical connectors 10, including such devices as terminal blocks, posts, crimp-on connectors, insulation displacement connectors, plug and socket connectors, blade connectors, and ring and spade terminals. In one embodiment, the electrical connector 10 is divided into two portions, a first portion 11 and a second portion 13. Preferably, each portion 11 and 13 is connected with one of the wires or devices to be connected to each other. Preferably, the two portions 11 and 13 of the electrical connector 10 form a male/female arrangement.

Figure 1A:
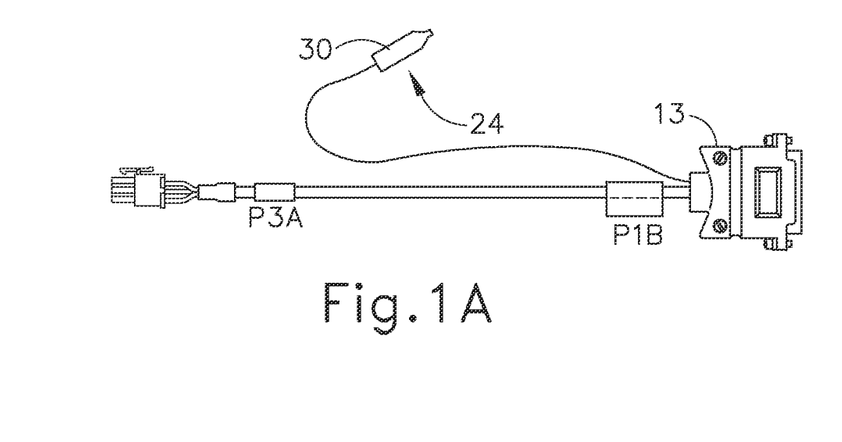
FIGS. 1A-1D depict various planar views of an electrical connector for at least one thermocouple, in accordance with one embodiment of the present invention.
Figure 1B:
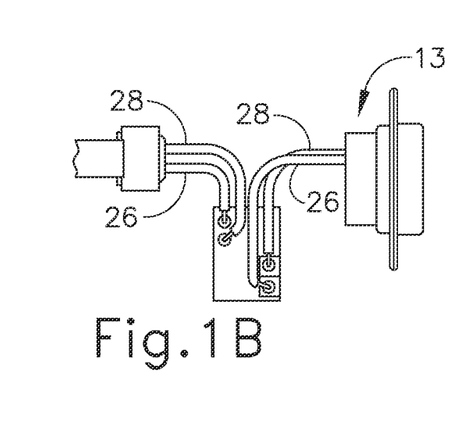
Figure 1C:
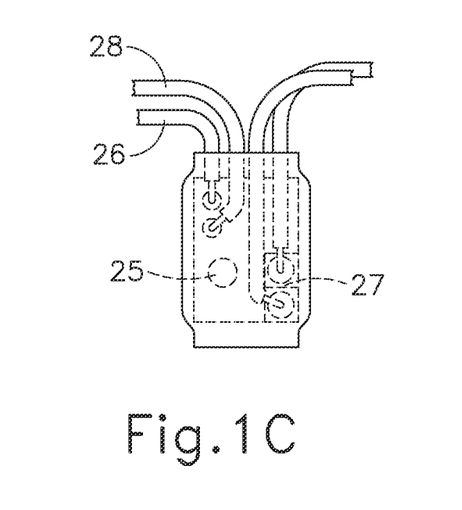
Figure 1D:
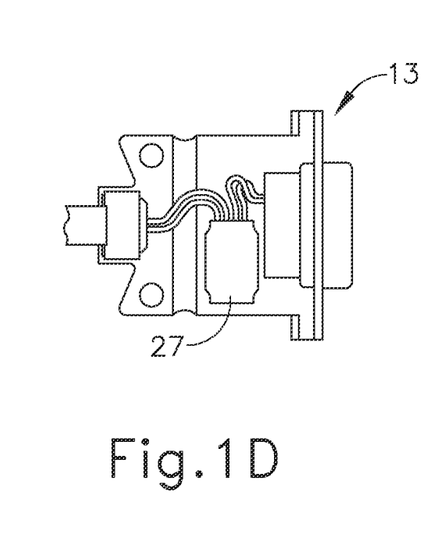
Figure 1E:
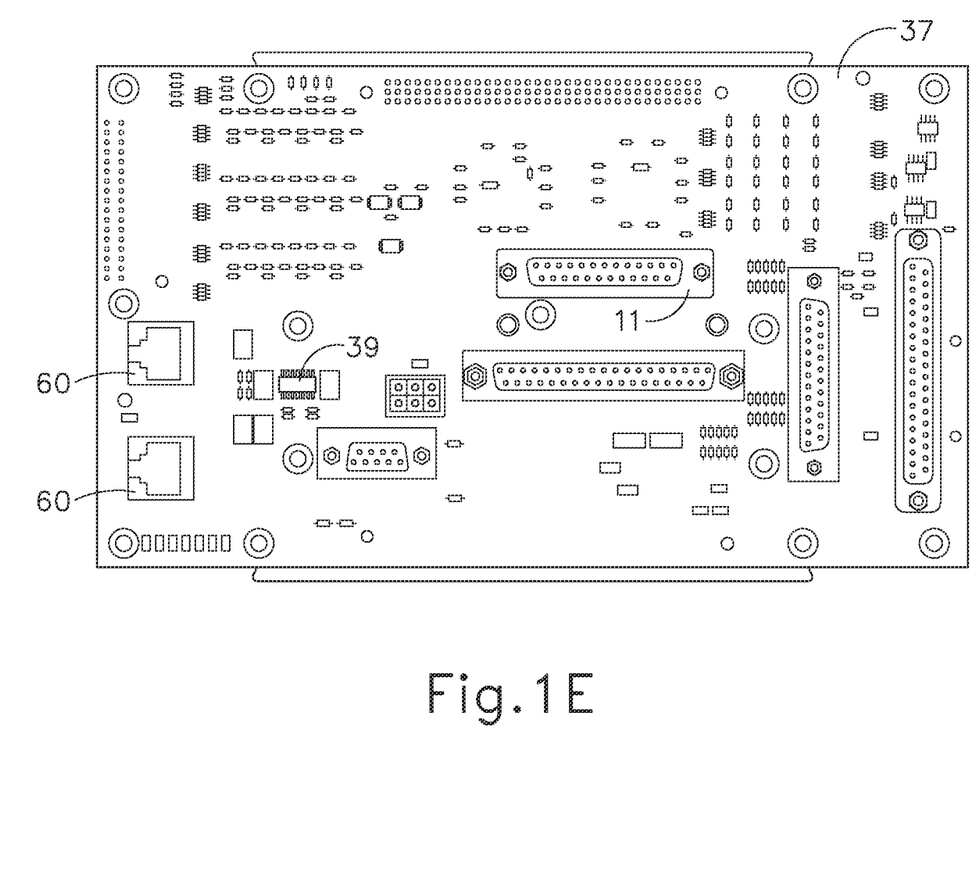
FIG. 1E depicts a first portion of an electrical connector mounted on a circuit board, in accordance with one embodiment of the present invention.
Figure 2:
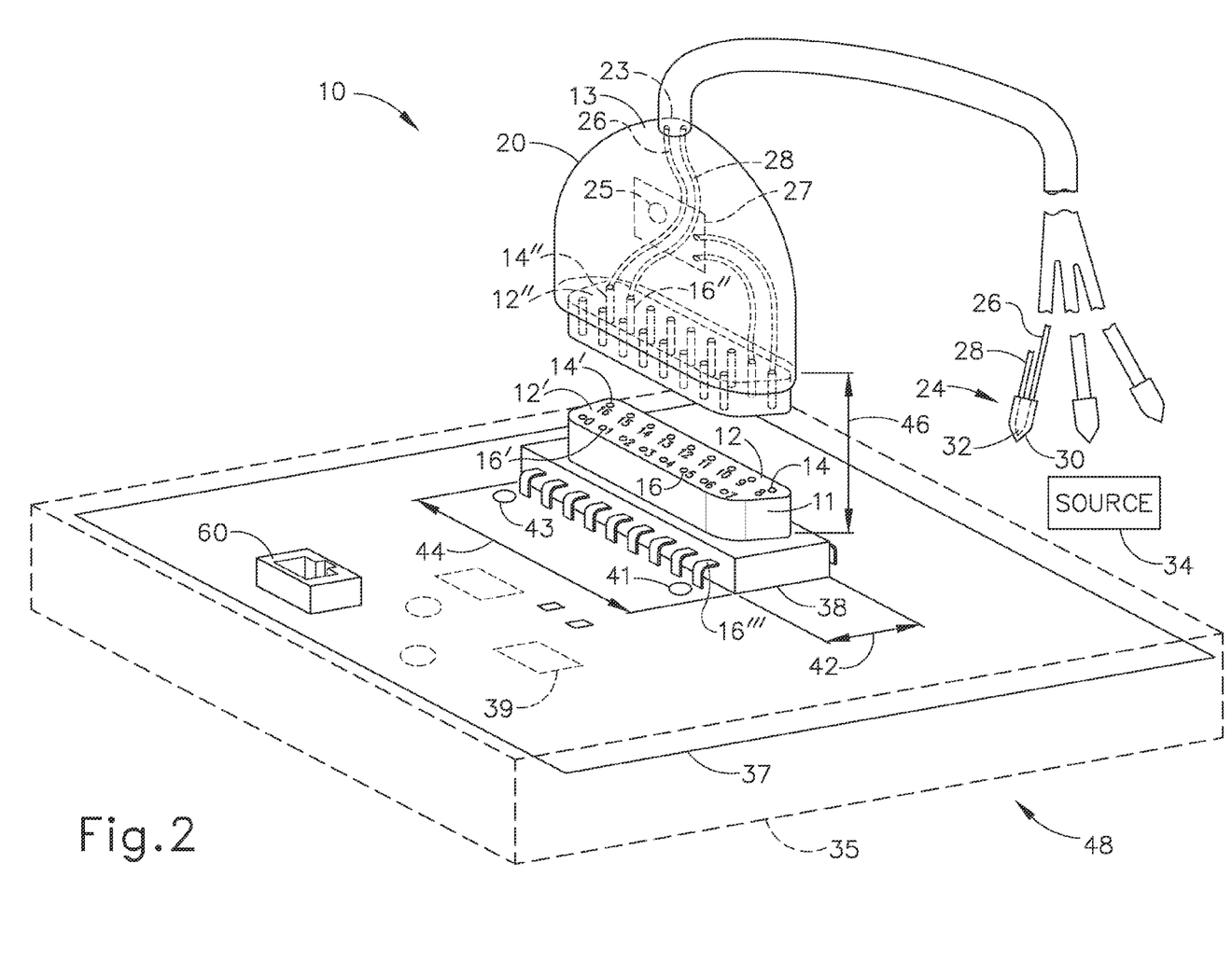
FIG. 2 depicts a simplified perspective view of an exemplary circuit board incorporating the first portion of the electrical connector of FIG. 1E mounted within a housing along with a second portion of the electrical connector outside the housing and connected with the first portion, in accordance with one embodiment of the present invention.

With reference to FIG. 2, preferably, the electrical connector 10 has rows or tiers 12 and 14 of terminals or connectors 18. On each tier 12, 14, there are terminals or connectors generally designated by the reference numeral 18, with typically two terminals per channel for a single input device, such as a thermocouple. For example, terminals, #0 and #1 are for channel 1, terminals #2 and #3 are for channel 2, and so forth. Preferably, if the electrical connector has two portions 11 and 13, then the first portion 11 has tiers 12' and 14' which engage and/or mate with complimentary tiers 12" and 14" formed on the second portion 13, and the tiers 12' and 14' include terminals 16' which engage and/or mate with terminals 16" formed on the second portion 13.

Incoming wires, such as wires 26 and 28, may enter a housing 20 of the second portion 13, which houses the complimentary tiers 12" and 14". Each incoming wire is then clamped to or secured with a terminal 16". A plurality of input wires may originate from a variety of devices and input to the electrical connector 10. In this example, the two illustrated wires are for a thermocouple 24. As discussed below, a thermocouple 24 generally has two dissimilar metal wires 26 and 28, and may employ a protective sheath or probe 30 at the measuring junction 32 of the two wires 26 and 28. The tip of thermocouple 24, known as the thermocouple measuring junction, may be encased within a sensor probe 30 positioned at a source 34 to measure the temperature of the source 34.

The incoming wires enter the electrical connector 10, and particular enter the housing 20 of the second portion 13 at an opening 23. Preferably, a temperature sensor 25 is located adjacent, and preferably on, and most preferably, within in the housing 20 of the second portion in order to measure the temperature of the second portion 13. In one embodiment, the temperature sensor 25 is located on a circuit board 27 through which incoming wires 26 and 28 travel on, near or through. Preferably, the temperature sensor 25 is located near the incoming wires 26 and 28 in order to obtain an accurate measure of the temperature of the connection point of the incoming wires 26 and 28 at the second portion 13 of the electrical connector 10. Preferably, the temperature sensor 25 is located near where the incoming wires 26 and 28 connect with connector terminals 14" and 16", which is where the cold junction resides, in order to obtain an accurate measure of the cold junction temperature. Preferably, the sensor 25 is connected to a connector terminal, or pair of connector terminals, in order to output a signal from the sensor 25 to a controller, preferably located on circuit board 37.

In one embodiment, the incoming wires 26 and 28 are thermocouple wires 26 and 28 which enter the second portion 13 of the electrical connector 10 at the opening 23. A reference junction or cold junction for the two wires 26 and 28 is formed at the electrical connector 10, and specifically, at the point in which the connector terminals 14" and 16" of the second portion 13 engage and/or mate with thermocouple wires 26 and 28. The first portion 11 may be partially or almost entirely housed within a housing 35 containing a circuit board 37 having circuitry 39, preferably used to help determine a temperature measured at the thermocouple 24, and to transmit information, such as a temperature measured at the thermocouple 24, to other devices, such as other machinery or process controllers. The second portion 13 may be partially or entirely housed outside the housing 35. A first temperature within the housing 35 and therefore at the terminals 16' of the first portion 11 may vary widely from a second temperature outside the housing 35, since the environment outside the housing 35 may differ from that of the environment within the housing.

As a result, in order to determining the cold junction temperature for a pair of thermocouple wires 26 and 28 terminated at an electrical connector 10 having two or more portions, a second temperature sensor 41 and preferably a third temperature sensor 43, are located within the housing 35. Preferably, the second and third temperature sensors 41 and 43 are mounted alongside the terminals 16' of the first portion 11. In one embodiment, the second and third temperature sensors 41 and 43 are mounted on the circuit board 37 alongside the terminals 16' of the first portion 11, as shown in FIG. 2.

An analog or digital output may exit the electrical connector 10 from the first portion 10 of the electrical connector 10 to the circuit board 37, preferably at interface terminals 16''' which connect the terminals 16' with the circuit board 37. Preferably, the analog or digital output may exit the electrical connector 10 from the first portion 10 to a control system or electronic device as described below. In one embodiment, the control system or device is located on the circuit board 37 and in another embodiment the control system or device is located remote from the circuit board 37. It should be noted that the electrical connector 10 is only given as an example, and that a variety of electrical connectors 10 having a first portion 11 located within a housing 35 and a second portion 13 at least partially located outside the housing 35, may be employed with the present technique. For the illustrated embodiment, the bottom 38 of the first portion 11 of the multi-tier electrical connector 10 may mount to an electronic substrate, such as a circuit board 37 (e.g., via pins or interface terminals 16'''), an instrument bus, an input/output device, other temperature module components, and so forth. Furthermore, the terminals 16 and tiers 12 and 14 may provide for different functions, such as power connections, input/output, co-junction connections, chassis grounds, and so forth.

The multi-tier electrical connector 10 may be employed alone as part of a thermocouple system, or in conjunction with a machine monitoring and protection system designed as a distributed network of modules deployed on an open standard industrial bus, and so forth. The electrical connector 10 may be part of an intelligent multi-channel temperature monitor, in a package, for example. Further, the electrical connector 10 may be configured for a resistance temperature detector (RTD), an isolated thermocouple, grounded thermocouple, and so forth. In certain applications, the electrical connector 10 may be integrated in a standard industrial bus system, such as Device Net. In other applications, the modules may be provided with standard 4 to 20 milliamps outputs for each channel. Furthermore, applications requiring integral relays may be accommodated via module linking and extension relay modules, for example. In sum, the electrical connector 10 as part of a temperature module may operate as a standalone, with no interface to higher level control systems or interactive user interfaces, or the electrical connector 10 as part of a temperature module may be deployed on a standard or dedicated Device Net network, for example, where the electrical connector 10 as part of a temperature module may provide real-time data and information to other modules, programmable logic controllers (PLC), distributed control systems (DCS), conditions monitoring systems, and so on. Configuration may be formed remotely via the Device Net network, for example or locally by a personal computer connected to the integral serial interface on the temperature module. For local configuration, a serial configuration utility may be packaged with the relay module.

The temperature of the electrical connector 10 (the cold junction temperature) is typically required to calculated the temperature of the source 34 being measured by the thermocouple 24. In less demanding applications, a single temperature sensor, such as a thermistor or a semiconductor temperature sensor for example, may be positioned anywhere on the electrical connector 10, to give a single temperature value for the entire electrical connector 10, with the assumption that the block 10 operates under substantially isothermal conditions. However, in increasingly common demanding applications, a relatively accurate (and precise) temperature measurement is needed at each terminal 16 or pair of terminals 16' and 16". Indeed, non-isothermal behavior of the electrical connector 10, especially along tiers 12 and 14 through which multiple channels may travel through, and between multiple portions 11 and 13 of the electrical connector 10, is often significant enough to cause errors in the temperature measurement of the various sources 34 if only one thermocouple 24 is used per tier 12, 14 or per portion 11 and 13. In general, temperature differences may exist along the width 42, length 44, or height 46 of the electrical connector 10. Thus, though an expensive option, a temperature sensor, such as a thermistor may be installed at each terminal 16 to provide for accurate reference or cold junction temperatures. This expensive option may avoid errors in the measurement of cold junction temperature, and thus avoid the related errors in the measured temperature from the thermocouple tip (measuring junction). A less expensive option is to install a temperature sensor at each portion 11 and 13 of the electrical connector 10, that is, at multiple locations along the height 46 of the electrical connector 10, and preferably, to install a temperature sensor at multiple locations along the length 44 of the electrical connector 10. In one embodiment, a temperature sensor may be installed at multiple locations along the width 42 of the electrical connector 10. By using interpolation between the temperature sensors installed at multiple locations along the height 46, length 44, and/or width 42 of the electrical connector 10, the cold junction temperature for each terminal 16 within the electrical connector 10 may be accurately determined. Preferably, the temperature sensors are installed near or at each end of the tiers 12, 14 within the electrical connector 10 along the height 46, length 44, and/or width 42 of the electrical connector 10, and preferably, each tier 12 and 14.

FIG. 2 is a simplified perspective view of an exemplary temperature module 48 incorporating the multi-tier electrical connector 10 of FIG. 1A-1E. The exemplary temperature module 48 may represent, for example, LTC24 temperature modules manufactured by LAM Research Corporation of Fremont, Calif. However, it should be apparent that a variety of other electrical connectors 10, input/output devices, and so on may be utilized with the present technique. Further, the technique may be applied to a variety of measuring devices other than thermocouples (e.g., resistance temperature detectors, differential pressure devices, etc.) requiring a reference property (e.g., temperature, pressure, flow, etc.) of a termination or end point.

In the exemplary temperature module 48, the electrical connector 10 may couple to an input/output module or circuitry 39 which may contain a bus interface and circuitry needed to perform specific functions related to a given application. The electrical connector 10 (e.g., of FIG. 1) may mount to a base unit (not shown) or a circuit board 37, or may be integral with the base unit (not shown) or circuit board 37 which may also contain the input/output module or circuitry 39. Also within the exemplary module 48, the electrical connector 10 and circuit board 37 may accommodate termination wiring for thermocouples, millivolt inputs, and the like. Terminals 16''' may be provided for communication and/or interface with the circuit board 37. The circuit board 37 may include a variety of components and devices. Furthermore, the base unit (not shown) or circuit board 37 may include a slot and/or a locking tab to accommodate mounting and/or locking into place the base unit (not shown) or circuit board 37 to a Deutsches Institut für Normung ('DIN') rail or other devices and connections. A connector 60, such as a RJ45 connector may be employed by the terminal base unit or circuit board 37. In the illustrated embodiment, the connector 60 is a female RJ45 connector. However, it should be apparent that male connectors may also be included, and the various connectors may be oriented at different locations along the terminal base unit or circuit board 37.

In one embodiment, first and second temperature sensors 25 and 41, preferably thermistors, are disposed at two or more respective portions 11 and 13 of the electrical connector 10, which is preferably adapted to receive measurement signals (i.e. thermocouple signals) from the thermocouple 24 via wires 26 and 28. Preferably, a third temperature sensor 43 is disposed alongside the second temperature sensor 41, both of which are alongside and preferably, at each end of, the tier 12' of the first portion. The temperature sensors 25, 41, and 43 are employed to measure the cold junction temperature at three different points within the electrical connector 10: two points (for sensors 41 and 43) which vary along the length 44 of the electrical connector 10 and two points (for either sensors 41 or 43 and sensor 25) which vary along a height 46 of the electrical connector 10. Preferably, sensors 41 and 43 are positioned alongside terminals 16', numbers 7 and 0, respectively. Of course, more than three temperature sensors may be employed, and the temperature at a variety of the terminals 16' and 16'' may be measured. Preferably, if the temperature sensors are thermistors, a resistive element of each thermistor interfaces with a clamp or other device to measure the temperature of a thermocouple wire engaged with the clamp or other device within the terminal 16.

Features previously discussed may be utilized by the temperature module 48. For example, the module 48 may be configured to measure either an RTD or an isolated thermocouple, or designed specifically for thermocouple measurements, isolated or grounded. For applications where it is not possible to integrate the temperature module 48 directly via a bus, such as Device Net, the modules may provide for standard 4 to 20 milliamp outputs for each channel. The temperature module 48 may operate stand alone, with no interface to higher level control systems or interactive user interfaces, or temperature module 48 may also be deployed on a standard or dedicated device net network where the temperature module 48 may provide real time data and status information to other temperature modules, PLCs, DCSs, and conditional monitoring systems. As previously discussed, the configuration can be performed remotely via a network or locally by personal computer connected to an integral serial interface. And again, the terminals 16 on the electrical connector 10 may be used for power connections, cold junction connections, chassis grounds, input/output wiring, input/output commons, etc. Further, the temperature module 48 may be daisy-chained to additional modules.

Figure 3:
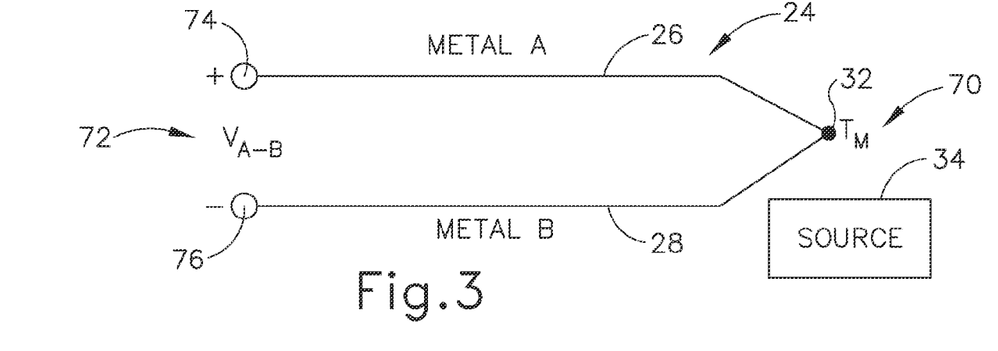
FIG. 3 depicts a diagrammatical representation of an exemplary thermocouple having a junction of two dissimilar metals, in accordance with one embodiment of the present invention.

FIG. 3 illustrates a basic concept of the exemplary thermocouple 24 represented in FIG. 1. When the junction 32 between two dissimilar metals (metal A and metal B) within wires 26 and 28, respectively, is heated or cooled, an open circuit voltage 72 (also called the Seebeck voltage 72) is generated as a function of the temperature $T_M$ 70 at the junction 32. In the illustrated embodiment, the temperature of a source 34 (hot or cold) is being measured. For a relatively close proximity of the measuring junction 32 (or probe tip) to the source 34, the temperature $T_M$ 70 should be substantially the same as the temperature of the source 34. The illustrated source 34 may be representative of any hot, ambient, or cold source in which the temperature is to be measured. Furthermore, although almost any two types of metal can be used to make a thermocouple, a number of standard types are used because they process predictable output voltages and large temperature gradients. For example, for a K type thermocouple, which is a common thermocouple, one wire 26 includes a nickel-chromium metal and the other wire 28 includes a nickel-aluminum metal. Standard tables may be generated to show the voltage produced by thermocouples at any given temperature. In the K type thermocouple, for example, the voltage produced at 300° C. is 12.2 millivolts. To measure voltage in this example, the ends 74 and 76 of the wires 26 and 28, respectively, connect to the terminals 8 and 9, respectively, of FIG. 1. The voltage 72 may be converted to the temperature $T_M$ 70 at the junction 32, which is indicative of the temperature of the source 34 being measured. The voltage 72 varies with changes in temperature of the sensing or measuring junction 32. Thus, the Seebeck voltage 72 (or open-circuit voltage 72) between the two dissimilar metals 26 and 28 is used to calculate the measured temperature, $T_m$. The two dissimilar metals (metal A and metal B) may be encased in a probe wall, for example. Thermocouples are available either as bare wire "dead" thermocouples which offer, for example, low cost and fast response times, or the thermocouples may be built into probes. A wide variety of probes are available and may be suitable for different measuring applications (industrial, scientific, food temperature, medical research, etc.). Common types of connectors for probes are standard round pins and the miniature-type flat pins.

Thus in sum, thermocouples measure temperature by generating a millivolt signal proportional to the temperature difference between the junction of two dissimilar metals. One junction is typically encased in a sensor probe at the point of measurement, and the other junction is connected to the measuring or control instrument. Since the ambient temperature changes in the field or control room where the measuring instrument is located (typically the cold-junction), the actual millivolt signal generated by the thermocouple fluctuates accordingly, causing a "cold-junction error." Understanding of cold junction compensation is important because error in the measurement of cold junction will lead to error in the measured temperature from the thermocouple tip (measuring junction). The measuring instrument should also allow for the fact that the thermocouple output is typically nonlinear over relatively wide ranges of measured temperature. The relationship between temperature and output voltage may be a complex polynomial equation, for example, depending on the thermocouple type. Coefficients for the polynomial may be tabulated for the different types of thermocouples to accommodate nonlinear behavior of the voltage and temperature relationship.

Figure 4:
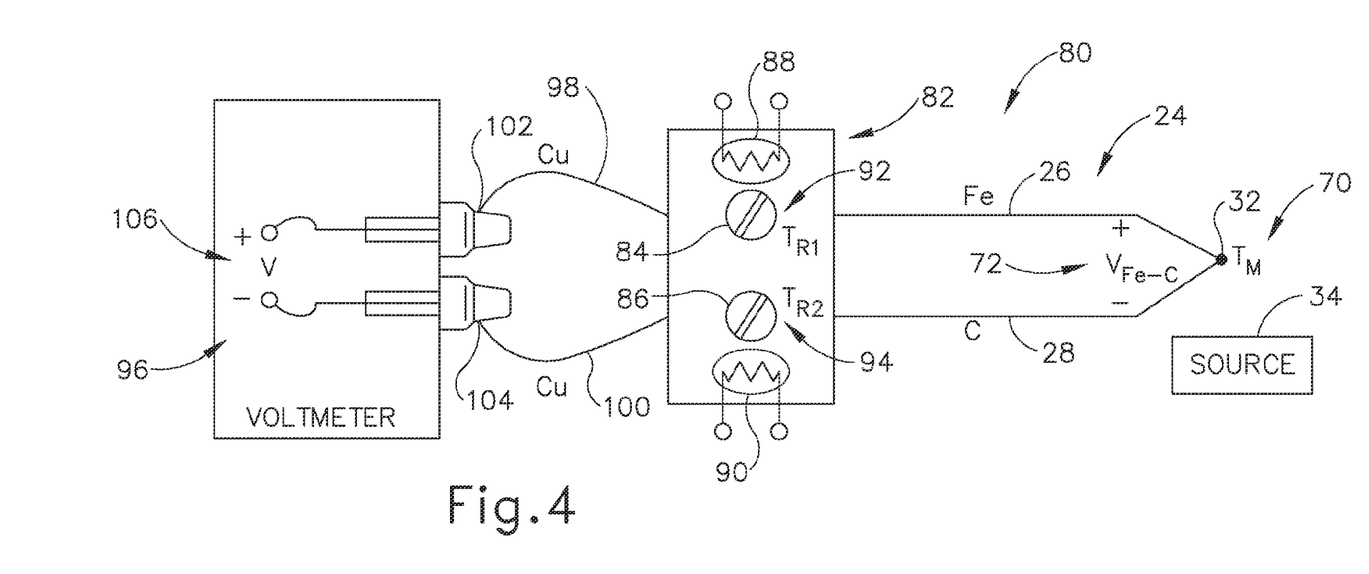
FIG. 4 depicts a diagrammatical representation of a thermocouple system having the thermocouple of FIG. 3, a terminal block, and a voltmeter, in accordance with one embodiment of the present invention.

FIG. 4 depicts a thermocouple assembly 80 having the thermocouple 24 with the wires 26 and 28 connected to a terminal block 82 having terminals 84 and 86. The two terminals 84 and 86 form a single channel for the thermocouple 24. The temperature at the terminals 84 and 86 are the cold junction (reference) temperature needed to calculate the measured temperature 70. Thermistors 88 and 90, whose resistance is a function of temperature, provide a way to measure the absolute temperature of the reference (cold) junction. The temperatures 92 and 94 at terminals 1 (84) and 2 (86), respectively, are depicted. For relatively narrow temperature ranges, a variety of other temperature sensors may be employed, such as diode or transistor junctions, thermistors, positive or negative temperature coefficient resistors, and so forth. The terminal block 82 is connected to a voltmeter 96 via the leads 98 and 100, which connect to the voltmeter 96 at connections 102 and 104. The voltmeter measures a voltage 106 to ultimately give the Seebeck voltage 72 to give the measured temperature 70.

Figure 5:
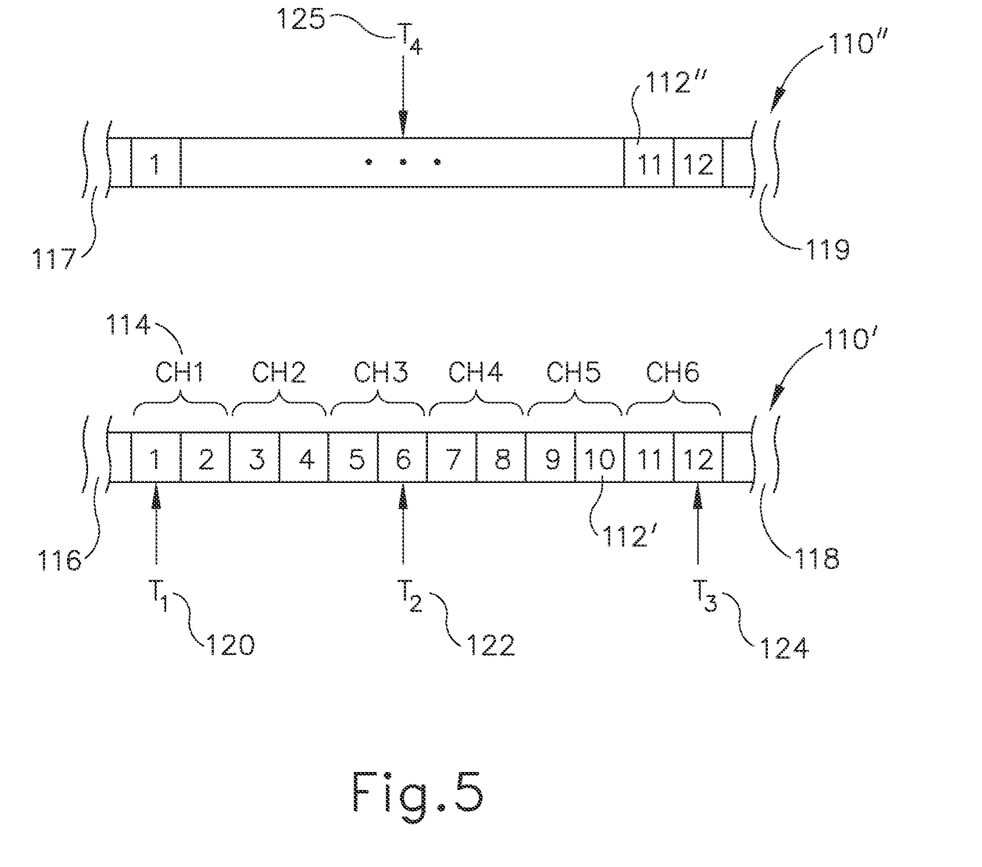
FIG. 5 depicts a graphical representation of a terminal strip or terminal block for a thermocouple, in accordance with one embodiment of the present invention.

FIG. 5 is a graphical representation of a terminal strip or tier 110' within a first portion of an electrical connector having terminals 112' and channels 114. The terminal strip or tier 110' is depicted having ends 116 and 118 that may continue or stop. In the illustrated embodiment, temperature sensors are installed at terminals 1, 6, and 12 to give temperatures T1 120, T2 122, and T3 124, respectively. In this example, temperature sensors are not installed on the remaining of the 12 terminals. Instead, temperature values for the remaining terminals 2, 3, 4, 5, 7, 8, 9, 10, and 11 are interpolated based on the measured temperature values 120, 122 and 124. Thus, for example, the cold junction temperature of channel 1 is determined by averaging the measured temperature value at terminal 1 with the interpolated temperature value of terminal 2. As another example, for the cold junction temperature of channel 2, the interpolated values of temperature for terminals 3 and 4 are averaged. Therefore, the cold junction temperature of all six channels may be accurately determined with only two or three temperature sensors disposed on the strip or tier 110 in this example, avoiding the cost of utilizing a thermistor or other temperature sensor at each terminal which would require an additional nine thermistors. Preferably a second terminal strip or tier 110" is located within a second portion of an electrical connector having terminals 112" and channels 114. The terminal strip or tier 110" is depicted having ends 117 and 119 that may continue or stop. In the illustrated embodiment, at least one additional temperature sensor is installed at or near second terminal strip or tier 110" to give temperature T4 125. Then an additional interpolation may be performed between the first three temperatures T1-T3 and the third temperature in order to more accurately determine the cold junction temperature at each terminal made up of terminal pairs 112' and 112".

This technique may be employed on a variety of electrical connectors. In this example, the thermocouple input channels are located consecutively on a single tier of the terminal block, and thus fall along a single axis. Because they lay along a single axis, and because the total distance from end to end is relatively small (e.g., less than three inches), there are primarily four basic shapes the temperature profile of the terminals should take depending on the environment.

A firmware algorithm may be used to determine individual channel temperatures and may use linear or non-linear (i.e., logarithmic interpolation) on a three by two look-up table, for example, that has the three terminal locations as the X axis and the three corresponding temperatures as the Y axis. Input to the interpolation may be the mathematical position of the channel. For example, for a device having six channels, in consecutive order on terminal blocks numbered 1 through 12, channel 1 is on terminals 1 and 2, channel 2 is on terminals 3 and 4, and so on. For sensors (e.g., thermistors) located in the exemplary positions of terminals 1, 6, and 12, to determine the cold junction temperature of channel 2, input to the interpolation routine would be "3.5," for example, the representation of averaged or otherwise combined temperatures for terminals 3 and 4.

In one embodiment, a compensated temperature ($T_{comp}$) which is the actual physical temperature of the source 34, is determined as a function of the apparent measured temperature ($T_{meas}$) 1 at the source 34 by the probe 30, the temperature at each of the three temperature sensors 41, 43, and 25 (CJC1, CJC2, CJC3, respectively), a channel number (ch) for at least one thermocouple channel, the maximum number of thermocouple channels (maxch), and the temperature of a temperature sensor at which a calibration took place ($L_{cal}$), multiplied by a scale factor (k). The temperature of a temperature sensor at which a calibration took place ($T_{cal}$) is the temperature of the sensor at the time the manufacturer of the instrument assembly 48 performed the instrument calibration procedure as the final step in the procedure to manufacture and test the instrument. In one embodiment, the compensated temperature is calculated as follows: $T_{comp}=T_{meas}-(CJC1+(CJC2-CJC1)*(1-(ch/maxch))+k*(CJC3-T_{cal}))$.

Figure 6:
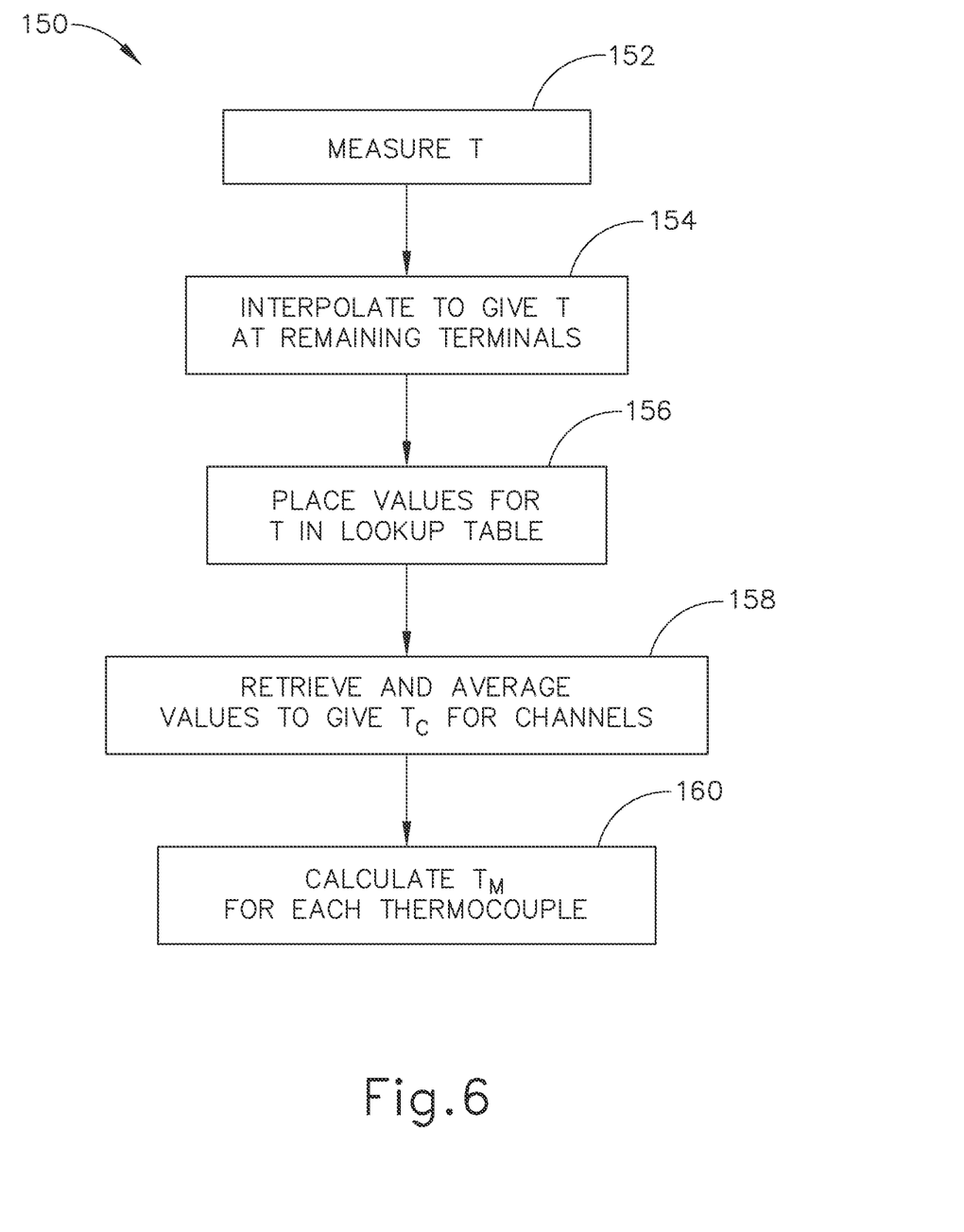
FIG. 6 depicts a block diagram of a method for calculating the measured temperature of a thermocouple, in accordance with one embodiment of the present invention.

FIG. 6 is a block diagram of a method 150 for determining cold junction and measured temperatures of a thermocouple. For a terminal block or terminal strip having several terminals, preferably the temperature of two or more portions of the electrical connector 10, and preferably at two or more terminals of the electrical connector 10 are measured with one or more temperature sensors, such as a thermistor (block 152). The temperature values for the remaining terminals are determined by interpolating and/or extrapolating based on the measured temperatures at the two or more terminals (block 154). The interpolation and/or extrapolation may take a variety of forms, such as logarithmic, linear, and so forth. All of the temperatures values, whether measured or calculated via interpolation, may be placed in a look-up table, as depicted by reference numeral 156. These temperatures values in the look-up table may be retrieved and averaged to give the cold junction temperature for a given channel (block 158). The cold junction temperature is then used to calculate the measured temperature of each thermocouple at the respective sources (block 160). In other words, based on the calculated value for the Seebeck voltage via the cold junction temperature measurement, the measured temperature may then be calculated for each thermocouple (block 160).

As utilized herein, the terms "approximately," "about," "substantially," and similar terms are intended to have a broad meaning in harmony with the common and accepted usage by those of ordinary skill in the art to which the subject matter of this disclosure pertains, and in one non-limiting embodiment the terms are defined to be within 10%, in another embodiment within 5%, in another embodiment within 1% and in another embodiment within 0.5%. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another. References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter. While various embodiments of the invention have been described, it will be apparent to those of ordinary skill in the art that other embodiments and implementations are possible within the scope of the invention. Accordingly, the invention is not to be restricted except in light of the attached claims and their equivalents.

The invention claimed is:

1. A method of using a thermocouple, comprising:
disposing at least one temperature sensor at each of two or more respective portions of an electrical connector that receives thermocouple signals;
measuring temperatures at the two or more portions, wherein at least one portion is inside a housing and at least another portion is at least partially outside the housing;
calculating the temperatures at each terminal of the electrical connector based on measured temperature values of the two or more respective portions having the disposed temperature sensors, wherein each of the temperature sensors is electrically connected to each terminal, wherein the electrical connector has more terminals than temperature sensors; and
calculating a cold junction temperature of a terminal for at least one thermocouple channel carrying the thermocouple signals based on measured or calculated temperature values of the terminals, or a combination thereof.

2. The method as recited in claim 1, comprising determining the temperature of a source measured by a thermocouple based on the cold junction temperature of the at least one thermocouple channel.

3. The method as recited in claim 1, wherein calculating temperature of each terminal comprises interpolation or extrapolation, or a combination thereof.

4. The method as recited in claim 1, wherein the temperature sensor comprises a thermistor or a semiconductor temperature sensor.

5. The method as recited in claim 1, wherein calculating temperature of remaining terminals comprises a non-linear calculation.

6. The method as recited in claim 1, comprising placing measured and calculated temperature values of each terminal into a lookup table.

7. The method as recited in claim 6, wherein calculating the cold junction temperature of the at least one thermocouple channel comprises retrieving temperature values from the lookup table.

8. The method as recited in claim 1, wherein a first portion of the electrical connector includes a plurality of thermocouple connectors, wherein each thermocouple connector receives a discrete thermocouple signal, wherein the disposing of a temperature sensor includes disposing two temperature sensors along the first portion of the electrical connector, each temperature sensor disposed near a different thermocouple connector, wherein the disposing of a temperature sensor also includes disposing a third temperature sensor on a second portion of the electrical connector, and wherein the first portion of the electrical connector is separate and apart from the second portion of the electrical connector.

9. The method as recited in claim 8, wherein the first portion of the electrical connector is mounted on a circuit board within a housing, wherein a part of the first portion extends outside the housing, and the second portion of the electrical connector connects with the part of the first portion which extends outside the housing.

10. The method as recited in claim 9, wherein the two temperature sensors disposed along the first portion of the electrical connector are mounted on the circuit board alongside the first portion of the electrical connector.

11. The method as recited in claim 10, wherein the two temperature sensors disposed along the first portion of the electrical connector allow for interpolation of a cold junction temperature along the plane of the circuit board, and the third temperature sensor allows for interpolation of the cold junction temperature across a panel boundary formed by the housing.

12. The method as recited in claim 10, further comprising determining a compensated temperature ($T_{comp}$) as a function of the measured temperature ($T_{meas}$), the temperature at each of the three temperature sensors (CJC1, CJC2, CJC3), a channel number (ch) for at least one thermocouple channel, the maximum number of thermocouple channels (maxch), and the temperature of the temperature sensor at which a calibration took place ($T_{cal}$), multiplied by a scale factor (k).

13. The method of claim 12, wherein the compensated temperature is calculated as follows: $T_{comp}=T_{meas}-(CJC1+(CJC2-CJC1)*(1-(ch/maxch))+k*(CJC3-T_{cal}))$.

* * * * *